United States Patent
Lin et al.

(10) Patent No.: US 12,096,369 B2
(45) Date of Patent: Sep. 17, 2024

(54) POWER SETTING METHOD AND ELECTRONIC DEVICE

(71) Applicant: Wistron Corporation, New Taipei (TW)

(72) Inventors: Jyun-Nian Lin, New Taipei (TW); Po-Tsang Lin, New Taipei (TW)

(73) Assignee: WISTRON CORPORATION, New Taipei (TW)

(*) Notice: Subject to any disclaimer, the term of this patent is extended or adjusted under 35 U.S.C. 154(b) by 56 days.

(21) Appl. No.: 17/989,748

(22) Filed: Nov. 18, 2022

(65) Prior Publication Data
US 2023/0397120 A1    Dec. 7, 2023

(30) Foreign Application Priority Data
Jun. 6, 2022 (TW) ................................. 111120934

(51) Int. Cl.
*H04W 52/02* (2009.01)
*G06F 1/3218* (2019.01)

(52) U.S. Cl.
CPC ...... *H04W 52/0254* (2013.01); *G06F 1/3218* (2013.01)

(58) Field of Classification Search
CPC ............ G06F 1/3218; H04W 52/0254; H04W 52/367
See application file for complete search history.

(56) References Cited

U.S. PATENT DOCUMENTS

2012/0258772 A1* 10/2012 Brogle .................. H01Q 21/28 455/556.1
2013/0217450 A1    8/2013 Kanj et al.
2015/0160780 A1    6/2015 Park
2017/0192478 A1*   7/2017 Mercer .................. G01D 5/142
2019/0020097 A1*   1/2019 Chang .................... H01Q 1/243
2019/0036563 A1*   1/2019 Koshy .................... H04W 52/18

FOREIGN PATENT DOCUMENTS

| CN | 109982423 A | 7/2019 |
| CN | 111614840 A | 9/2020 |
| CN | 112769501 A | 5/2021 |
| CN | 113765605 A | 12/2021 |
| TW | 201319861 A | 5/2013 |
| TW | 201738699 A | 11/2017 |
| WO | 2021032125 A1 | 2/2021 |

OTHER PUBLICATIONS

Examination report dated Jun. 19, 2023, listed in correspondent Taiwan patent application No. 111120934.
Examination report dated Feb. 3, 2023, listed in correspondent Taiwan patent application No. 111120934.
The extended European search report dated Oct. 19, 2023, listed in related European patent application No. 22213807.5.

* cited by examiner

*Primary Examiner* — Terrell S Johnson
(74) *Attorney, Agent, or Firm* — McClure, Qualey & Rodack, LLP

(57) ABSTRACT

A power setting method and an electronic device are provided. The power setting method includes: determining in a situation that, according to an enable signal corresponding to a network sharing function of the electronic device, the network sharing function is enabled; and in response to the network sharing function being enabled, setting an output power of the electronic device according to a first setting mode.

16 Claims, 10 Drawing Sheets

POWER SETTING METHOD AND ELECTRONIC DEVICE

CROSS-REFERENCE TO RELATED APPLICATION

This non-provisional application claims priority under 35 U.S.C. § 119(a) to Patent Application No. 111120934 filed in Taiwan, R.O.C. on Jun. 6, 2022, the entire contents of which are hereby incorporated by reference.

BACKGROUND

Technical Field

The present invention relates to a power setting technology of an electronic device, and in particular, to a power setting technology of a hand-held communication product.

Related Art

The fifth-generation mobile communication (5G) is divided into sub-6G and mm-Wave systems that are applied to different frequencies. The current system architecture is non-standalone (NSA). The non-standalone architecture uses 4G LTE to communicate with a base station, and uses a 5G network to perform actual data transmission. Relevant communication products need to meet different test conditions that the total output power absorbed by a human body is less than 1.6 W/kg and 4 W/kg under restrictions of some regulations. Under a non-standalone system architecture, the communication products need to output 4G and 5G powers simultaneously, and an output power of Wi-Fi also needs to be considered. To meet regulatory restriction requirements, the 4G and 5G output powers of the communication products need to be greatly reduced. Therefore, it is very important to identify a specific usage scenario of a communication product to adjust an output power of the communication product, so that appropriate powers are outputted in various cases to meet all usage conditions and performance while the regulations are met. In some current methods, a grip sensor or a P-sensor is added to a hardware design. In some cases, the safest output power setting (minimum output power) is selected because the usage scenario cannot be identified. Generally, more sensors need to be added to allow the communication product to determine the output power, which increases the design difficulty and cost.

SUMMARY

In view of this, some embodiments of the present invention provide a power setting method, an electronic device, a computer-readable recording medium storing a program, and a non-transitory computer program product, to resolve problems of the prior art.

Some embodiments of the present invention provide a power setting method, performed by a processor. The power setting method includes: determining in a situation that, according to an enable signal corresponding to a network sharing function of the electronic device, the network sharing function is enabled; and in response to the network sharing function being enabled, setting an output power of the electronic device according to a first setting mode.

Some embodiments of the present invention provide a power setting method, performed by a processor. The power setting method includes: determining in a situation that, according to an enable signal corresponding to a network sharing function of the electronic device, the network sharing function is enabled; and in response to the network sharing function being enabled, setting an output power of the electronic device according to a first setting mode; in response to the network sharing function being not enabled, determining in a situation that, according to a distance between the electronic device and an object detected by a distance sensing module of the electronic device, the distance is less than a preset distance; and in response to the distance being less than the preset distance, setting the output power of the electronic device according to a third setting mode.

Some embodiments of the present invention provide a power setting method, performed by a processor. The power setting method includes: determining in a situation that an electronic device is in a mobile wireless base station and network sharing function mode; and in response to the electronic device being in the mobile wireless base station and network sharing function mode, setting a radio frequency module of the electronic device according to a first setting mode to set an output power of the electronic device.

DETAILED DESCRIPTION

Figure 1:
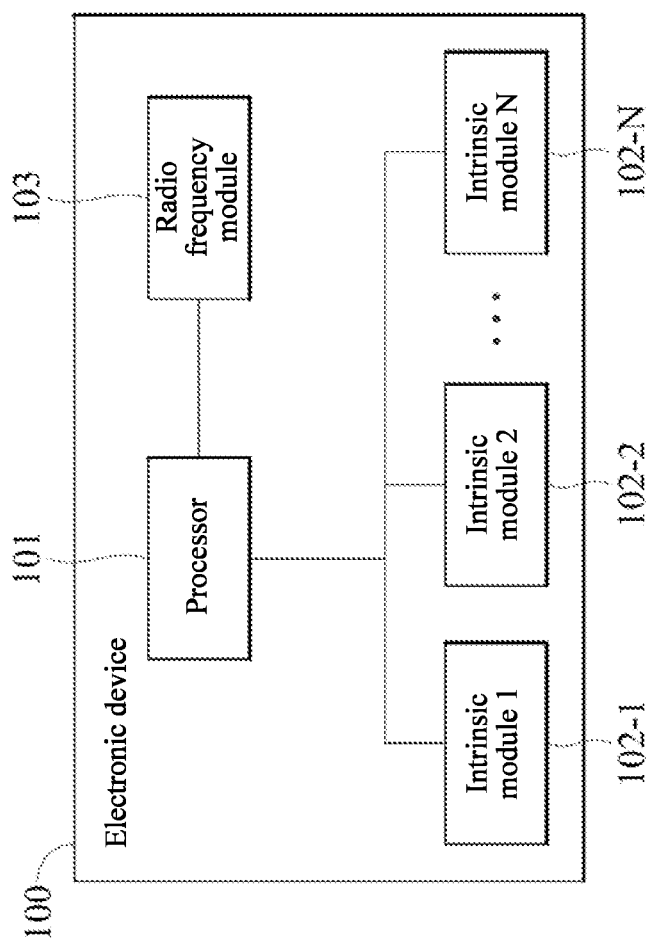
FIG. 1 is a block diagram of an electronic device according to an embodiment of the present invention.

The foregoing and other technical contents, features, and effects of the present invention can be clearly presented below in detailed description with reference to embodiments of the accompanying drawings. Thicknesses or sizes of the elements in the drawings represented in an exaggerated, omitted, or general manner are used to help a person skilled in the art to understand and read, and the sizes of elements are not completely actual sizes and are not intended to limit restraint conditions under which the present invention can be implemented and therefore have no technical significance. Any modification to the structure, change to the proportional relationship, or adjustment on the size should fall within the scope of the technical content disclosed by the present invention without affecting the effects and the objectives that can be achieved by the present invention. The same reference numerals are used to indicate the same or similar elements in all of the drawings. The term "couple" provided in the following embodiments may refer to any direct or indirect, wired or wireless connection means.

FIG. 1 is a block diagram of an electronic device according to an embodiment of the present invention. Referring to FIG. 1, an electronic device 100 includes a processor 101, a radio frequency module 103, and N intrinsic modules 102-1 to 102-N. N is a positive integer, and the value of N depends on an actual quantity of modules intrinsic to the electronic device 100. The electronic device 100 further has a plurality of executable functions. The radio frequency module 103 is a module of the electronic device 100 for processing a radio frequency signal. In some embodiments of the present invention, the radio frequency module 103 includes a Wi-Fi module. In some embodiments of the present invention, the radio frequency module 103 includes a Bluetooth module.

Figure 2:
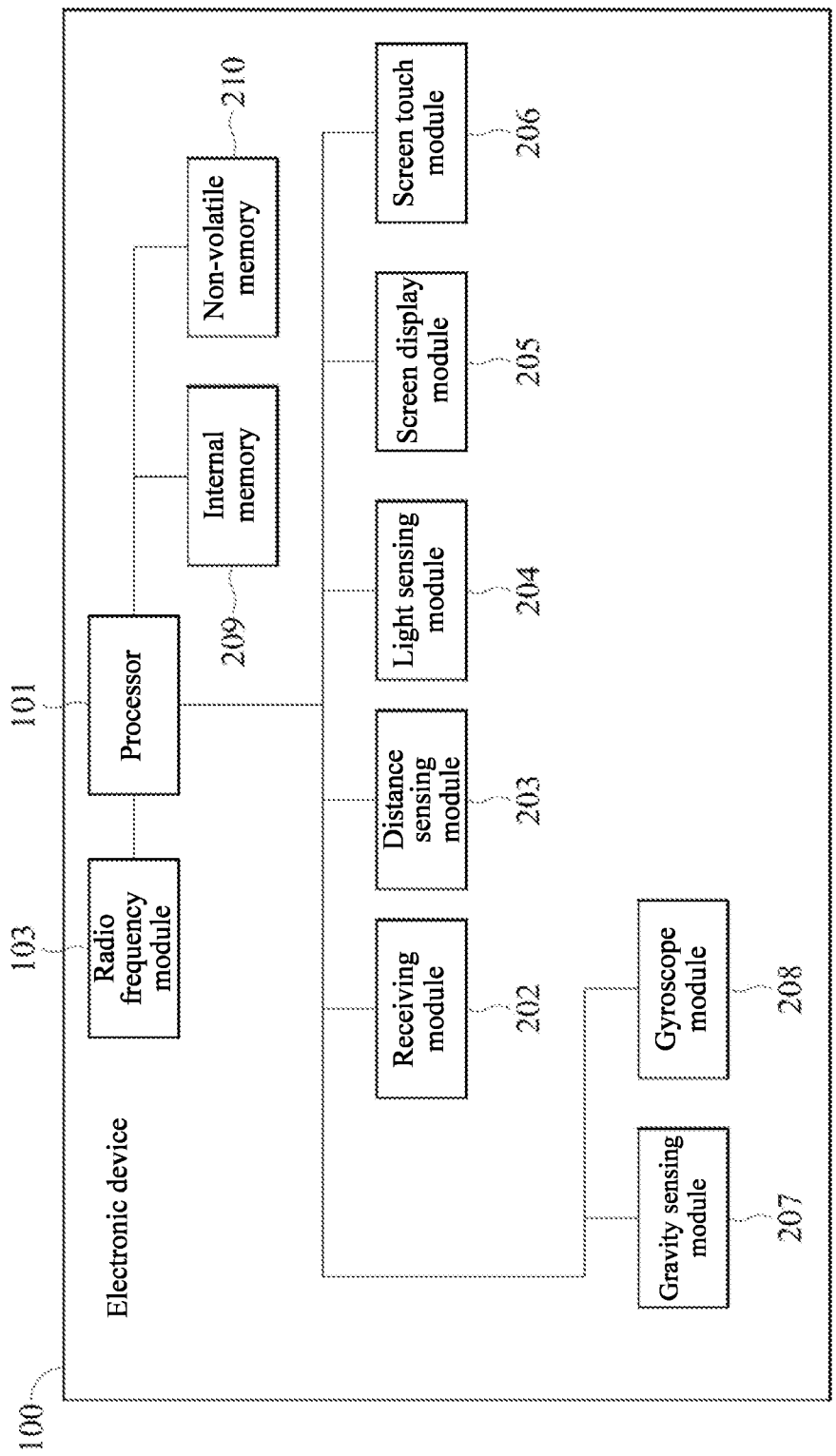
FIG. 2 is a block diagram of an electronic device according to an embodiment of the present invention.
Figure 3:
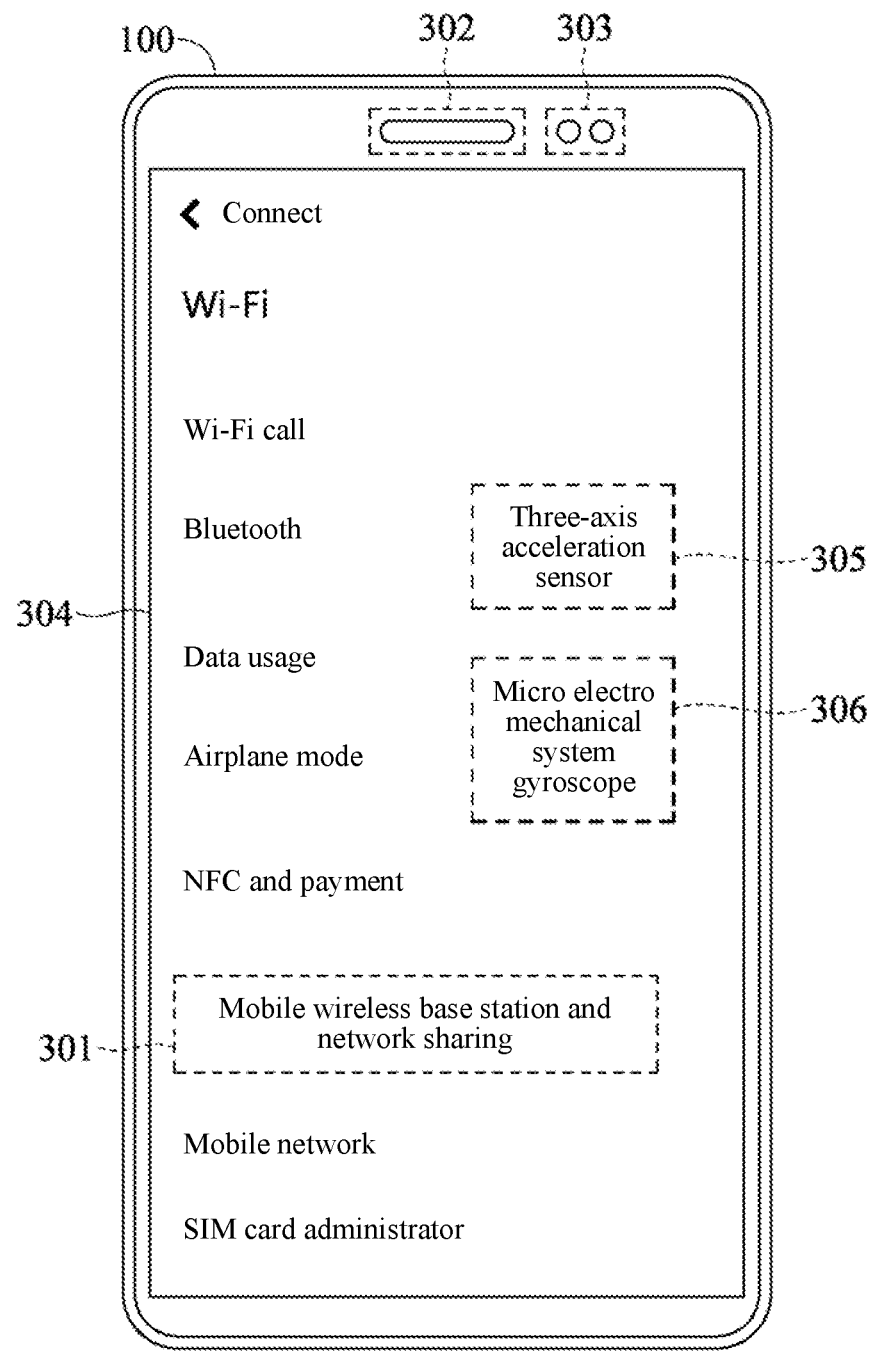
FIG. 3 is a schematic diagram of an electronic device according to an embodiment of the present invention.

FIG. 2 is a block diagram of an electronic device according to an embodiment of the present invention. FIG. 3 is a schematic diagram of an electronic device according to an embodiment of the present invention. Referring to FIG. 2 and FIG. 3 together, in some embodiments of the present invention, the electronic device 100 is a smart phone, and the intrinsic modules 102-1 to 102-N are a receiving module 202, a distance sensing module 203, a light sensing module 204, a screen display module 205, a screen touch module 206, a gravity sensing module 207, and a gyroscope module 208. The electronic device 100 further includes an internal memory 209 and a non-volatile memory 210. The executable function of the electronic device 100 is a network sharing function.

The network sharing function is a corresponding function of a mobile wireless base station and network sharing option 301 of the electronic device 100 shown in FIG. 3. When a user triggers the mobile wireless base station and network sharing option 301, the network sharing function of the electronic device 100 operates. During operation of the network sharing function, the processor 101 controls a corresponding hardware circuit in the electronic device 100 to use the electronic device 100 as an Internet access point, and shares the network with other devices through the Wi-Fi module in the radio frequency module 103, so that other electronic devices, such as a mobile phone, a tablet, or a computer, connect to the Internet. The corresponding hardware circuit may be designed in a different manner, which is not limited in the present invention. In this embodiment, the network sharing function of the electronic device 100 is a Wi-Fi hot spot sharing function, and the Wi-Fi hot spot is shared to other devices through a Wi-Fi network. In another embodiment, the network sharing function of the electronic device 100 is a Bluetooth sharing function, and a Bluetooth network is shared to other devices through a Bluetooth module in the radio frequency module 103.

The receiving module 202 is coupled to a receiver 302. The receiving module 202 converts an audio electrical signal into a sound signal and plays the sound signal through the receiver 302, to play an audio (voice or music).

The distance sensing module 203 emits an infrared ray through an infrared LED, and the infrared ray is received by an infrared detector after being reflected by an object, so that a distance is determined by determining intensity of the received infrared ray. The effective distance is about 10 meters. The infrared LED and the infrared detector are integrated into a distance and optical element 303. The distance sensing module 203 can sense whether the electronic device 100 is attached to an ear for a phone talk. The light sensing module 204 senses intensity of ambient light through a light sensing element, and the light sensing element is integrated into the distance and optical element 303.

The screen display module 205 is coupled to a display and touch element 304. The screen display module 205 drives the display and touch element 304 to display an image. The screen touch module 206 is coupled to the display and touch element 304. When the user touches the display and touch element 304, the display and touch element 304 generates a touch signal and transmits the touch signal to the screen touch module 206. The screen touch module 206 receives and processes the touch signal generated by the display and touch element 304. In this embodiment, the display and touch element 304 is a touch screen of a mobile phone.

The gravity sensing module 207 measures linear acceleration of the gravity sensing module 207 on X, Y, and Z axes, and returns values corresponding to the acceleration of the gravity sensing module 207 on the X, Y, and Z axes. The gyroscope module 208 measures angular acceleration of the gyroscope module 208 on the X, Y, and Z axes, and returns values corresponding to the angular acceleration of the gyroscope module 208 on the X, Y, and Z axes. In some embodiments of the present invention, the gravity sensing module 207 includes a three-axis acceleration sensor 305, and the gyroscope module 208 includes a micro electro mechanical system gyroscope (MEMS Gyroscope) 306.

The power setting method and how the modules of the electronic device 100 cooperate with each other according to some embodiments of the present invention are described in detail below with reference to the drawings.

Figure 4:
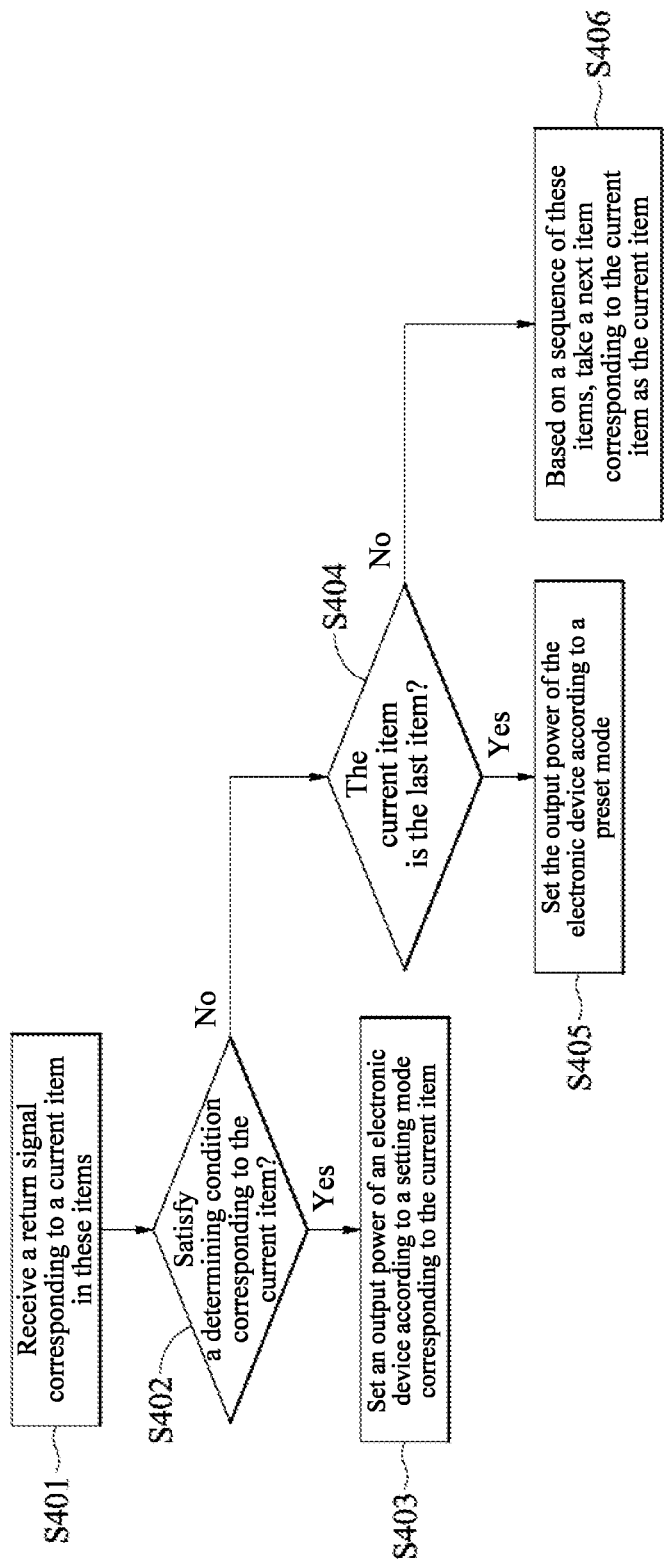
FIG. 4 is a flowchart of a power setting method according to some embodiments of the present invention.

FIG. 4 is a flowchart of a power setting method according to some embodiments of the present invention. Referring to FIG. 1 and FIG. 4 together, after the electronic device 100 is booted up, the electronic device 100 repeatedly performs steps S401 to S406 according to the sequence of the intrinsic modules 102-1 to 102-N and one or more executable functions of the electronic device 100. Hereinafter, for ease of description, the intrinsic modules 102-1 to 102-N of the electronic device 100 and the one or more executable functions of the electronic device 100 are referred to as items. In step S401, the processor 101 receives a return signal corresponding to a current item in the intrinsic modules 102-1 to 102-N and the executable functions of the electronic device 100. In step S402, the processor 101 determines whether the return signal of the current item satisfies a determining condition corresponding to the current item. If the return signal satisfies the determining condition corresponding to the current item, step S403 is performed. If not, step S404 is performed. In step S403, the processor 101 sets an output power of the electronic device 100 according to a setting mode corresponding to the current item. In step S404, if the current item is the last item, step S405 is performed. The last item refers to the last item in the sequence of the intrinsic modules 102-1 to 102-N and executable functions of the electronic device 100. If the current item is not the last item, step S406 is performed.

In step S405, the processor 101 sets the output power of the electronic device 100 according to a preset mode. In step S406, the processor 101 takes a next item corresponding to the current item as the current item based on the sequence of the intrinsic modules 102-1 to 102-N and the executable functions of the electronic device 100.

It should be noted that in this embodiment, the processor 101 may determine whether the current item is the last item based on a branch structure (for example, the code structure as follows: if (is the last module) {set to a preset power}else{take a next item as the current item}) in a programming language, to decide to set the output power of the electronic device 100 to the preset power (step S405) or take the next item corresponding to the current item as the current item (step S406). The processor 101 may also directly take a preset next item as the current item or set the output power of the electronic device 100 to the preset power based on the pre-written sequence of the intrinsic modules 102-1 to 102-N and the executable functions of the electronic device 100 in the hardware or software after determining that the determining condition corresponding to the intrinsic modules 102-1 to 102-N and the executable functions of the electronic device 100 is not satisfied, without using the foregoing branch structure in the programming language.

In some embodiments of the present invention, the intrinsic modules 102-1 to 102-N and the executable functions of the electronic device 100 include a network sharing function, and the network sharing function ranks the first in the sequence of the intrinsic modules 102-1 to 102-N and the executable functions of the electronic device 100. A current signal corresponding to the network sharing function is an enable signal used by the processor 101 to detect whether the network sharing function is enabled. The determining condition corresponding to the network sharing function is that the network sharing function is enabled, and the setting mode corresponding to the network sharing function is the first setting mode.

Figure 5:
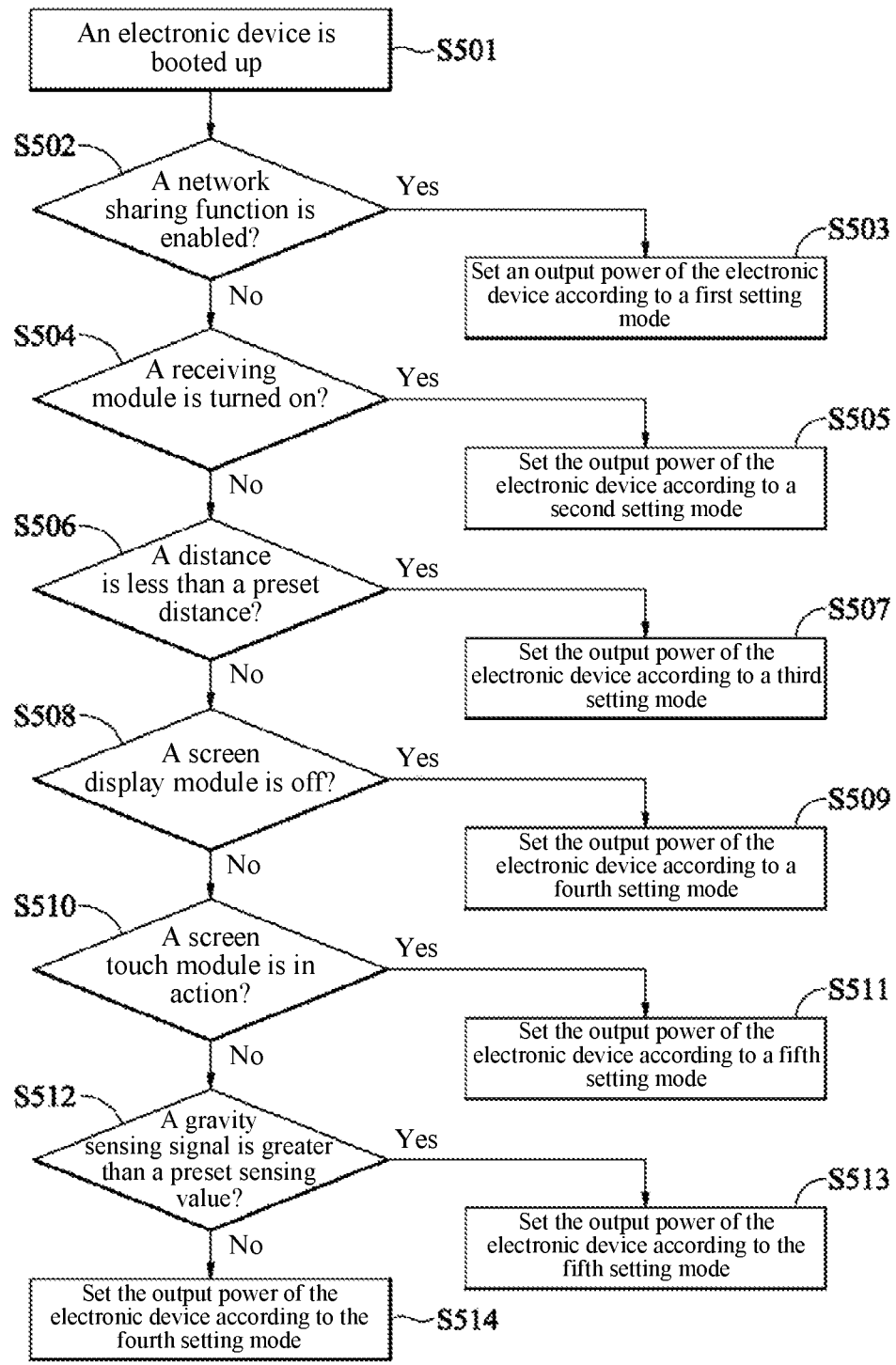
FIG. 5 is a flowchart of a power setting method according to some embodiments of the present invention.

FIG. 5 is a flowchart of a power setting method according to some embodiments of the present invention. Table (1) below is a corresponding table of a usage scenario and a power setting according to some embodiments of the present invention. Referring to FIG. 1, FIG. 5, and Table (1) together, in this embodiment, the intrinsic modules 102-1 to 102-N include a receiving module 202, a distance sensing module 203, and a screen display module 205, a screen touch module 206, and a gravity sensing module 207, and the executable functions of the electronic device 100 include a network sharing function.

Refer to Table (1) first.

TABLE 1

| Usage scenario | Power setting | Specific absorption rate test |
|---|---|---|
| Mobile wireless base station and network sharing function mode | Setting 0 | Body |
| Call mode | Setting 1 | Head |
| The electronic device is in a pocket or a holster | Setting 3 | Body |
| Hand-held and in use (with a screen touch action) | Setting 4 | Extremity |
| In use but placed on a table or shelf | Setting 2 | None |
| Hand-held and in use (without a screen touch action) | Setting 4 | Extremity |
| Hand-held but not in use | Setting 4 | Extremity |
| Not in use | Setting 2 | None |

Table (1) shows power settings that the electronic device 100 needs to use to meet different specific absorption rate (SAR) tests under various usage scenarios. For example, when the mobile wireless base station and network sharing function mode of the electronic device 100 is enabled, an output power of the electronic device 100 is set according to the setting 0, to satisfy the specific absorption rate (SAR) test of the body. When the electronic device 100 is in the call mode, the output power of the electronic device 100 is set according to the setting 1, to satisfy the specific absorption rate (SAR) test of the body.

It should be noted that the specific absorption rate test of the head, the specific absorption rate test of the body, and the specific absorption rate test of the extremity have different values according to different regulations. For example, the US Federal Communications Commission (US FCC) regulates that the specific absorption rate test of the head and the specific absorption rate test of the body are less than 1.6 W/kg, and the specific absorption rate test of the extremity is less than 4.0 W/kg.

It should also be noted that the actual output power setting methods and setting values of the electronic device 100 corresponding to the foregoing setting 0 to setting 4 vary according to designs of the products and the electronic device 100, which are not limited in the present invention.

In some embodiments of the present invention, the processor 101 of the electronic device 100 sets the output power of the electronic device 100 by setting an operating power of the radio frequency module 103.

In this embodiment, the sequence of the foregoing intrinsic modules 102-1 to 102-N and the executable functions of the electronic device 100, and the determining conditions corresponding to the intrinsic modules 102-1 to 102-N and the executable functions of the electronic device 100, and corresponding setting modes corresponding to the intrinsic modules 102-1 to 102-N and the executable functions of the electronic device 100 are as follows.

The network sharing function ranks the first. The current signal corresponding to the network sharing function is an enable signal used by the processor 101 to detect whether the network sharing function is enabled. The determining condition corresponding to the network sharing function is that the network sharing function is enabled, and the setting mode corresponding to the network sharing function is a first setting mode. The first setting mode is the foregoing setting 0.

The receiving module 202 ranks the second in the foregoing sequence. The current signal corresponding to the receiving module 202 is a receiving signal used for detecting whether the receiving module 202 is in action. The determining condition corresponding to the receiving module 202 is that the receiving module 202 is turned on, and the setting mode corresponding to the receiving module 202 is a second setting mode. The second setting mode is the foregoing setting 1.

The distance sensing module 203 ranks the third in the foregoing sequence. The current signal corresponding to the distance sensing module 203 is a distance between the electronic device 100 and an object detected by the distance sensing module 203 through the distance and optical element 303. The determining condition corresponding to the distance sensing module 203 is that the distance is less than a preset distance, and the setting mode corresponding to the distance sensing module 203 is a third setting mode. The third setting mode is the foregoing setting 3.

The screen display module 205 ranks the fourth in the foregoing sequence. The current signal corresponding to the screen display module 205 is a screen display signal used for detecting whether the screen display module 205 is turned on. The determining condition corresponding to the screen display module 205 is that the screen display module 205 is off, and the setting mode corresponding to the screen display module 205 is a fourth setting mode. The fourth setting mode is the foregoing setting 2.

The screen touch module 206 ranks the fifth in the foregoing sequence. The current signal corresponding to the screen touch module 206 is a screen touch signal used for detecting whether the screen touch module 206 is in action. The determining condition corresponding to the screen touch module 206 is that the screen touch module is in action, and the setting mode corresponding to the screen touch module 206 is a fifth setting mode. The fifth setting mode is the foregoing setting 4.

The gravity sensing module 207 ranks the sixth in the foregoing sequence, and the gravity sensing module 207 is the last module. The current signal corresponding to the gravity sensing module 207 is a gravity sensing signal corresponding to acceleration of the gravity sensing module on X, Y, and Z axes detected by the gravity sensing module 207. The determining condition corresponding to the gravity sensing module 207 is that the gravity sensing signal is greater than a preset sensing value, the setting mode corresponding to the gravity sensing module 207 is the fifth setting mode, and a preset mode is the fourth setting mode. The fifth setting mode is the foregoing setting 4, and the fourth setting mode is the foregoing setting 2.

In this embodiment, the gravity sensing module 207 detects the acceleration of the gravity sensing module on the X, Y, and Z axes and returns values $a_X$, $a_Y$, and $a_Z$ that correspond to the acceleration on the X, Y, and Z axes. The gravity sensing signal is defined as a sum of absolute values of $a_X$, $a_Y$, and $a_Z$, that is, Gravity sensing signal=$|a_X|+|a_Y|+|a_Z|$.

Based on the foregoing settings, in step S501, the electronic device 100 is booted up, and performs step S502. In step S502, the processor 101 determines, based on the enable signal, whether the network sharing function is enabled. If so, the electronic device 100 is in the usage scenario of "mobile wireless base station and network sharing function mode", and the processor 101 sets the output power of the electronic device 100 according to the first setting mode (setting 0) in step S503. If not, the processor determines in step S504, based on the receiving signal, whether the receiving module 202 is turned on. If so, the electronic device 100 is in the usage scenario of "call mode", and the processor 101 sets the output power of the electronic device 100 according to the second setting mode (setting 1) in step S505. If not, the processor determines in step S506 whether the distance between the electronic device 100 and any object is less than the preset distance. If the processor 101 determines that the distance between the electronic device 100 and any object is less than the preset distance, the electronic device 100 is in the usage scenario that "the electronic device is in a pocket or a holster", and the processor 101 sets the output power of the electronic device 100 according to the third setting mode (setting 3) in step S507. If not, the processor determines in step S508, according to the screen display signal, whether the screen display module 205 is off. If so, the electronic device 100 is in the usage scenario of "not in use", and the processor 101 sets the output power of the electronic device 100 according to the fourth setting mode (setting 2) in step S509. If not, the processor 101 determines in step S510, according to the screen touch signal, whether the screen touch module is in action. If so, the electronic device 100 is in the usage scenario of "hand-held and in use (with a screen touch action)", and the processor 101 sets the output power of the electronic device 100 according to the fifth setting mode (setting 4) in step S511. If not, the processor determines in step S512 whether the gravity sensing signal is greater than the preset sensing value. If so, the electronic device 100 is in the usage scenario of "hand-held and in use (without a screen touch action)", and the processor 101 sets the output power of the electronic device 100 according to the fifth setting mode (setting 4) in step S513. If not, the electronic device 100 is in the usage scenario of "in use but placed on a table or a shelf" and there is no human body or object nearby, and the processor 101 sets the output power of the electronic device 100 according to the fourth setting mode (setting 2) in step S514.

Figure 6:
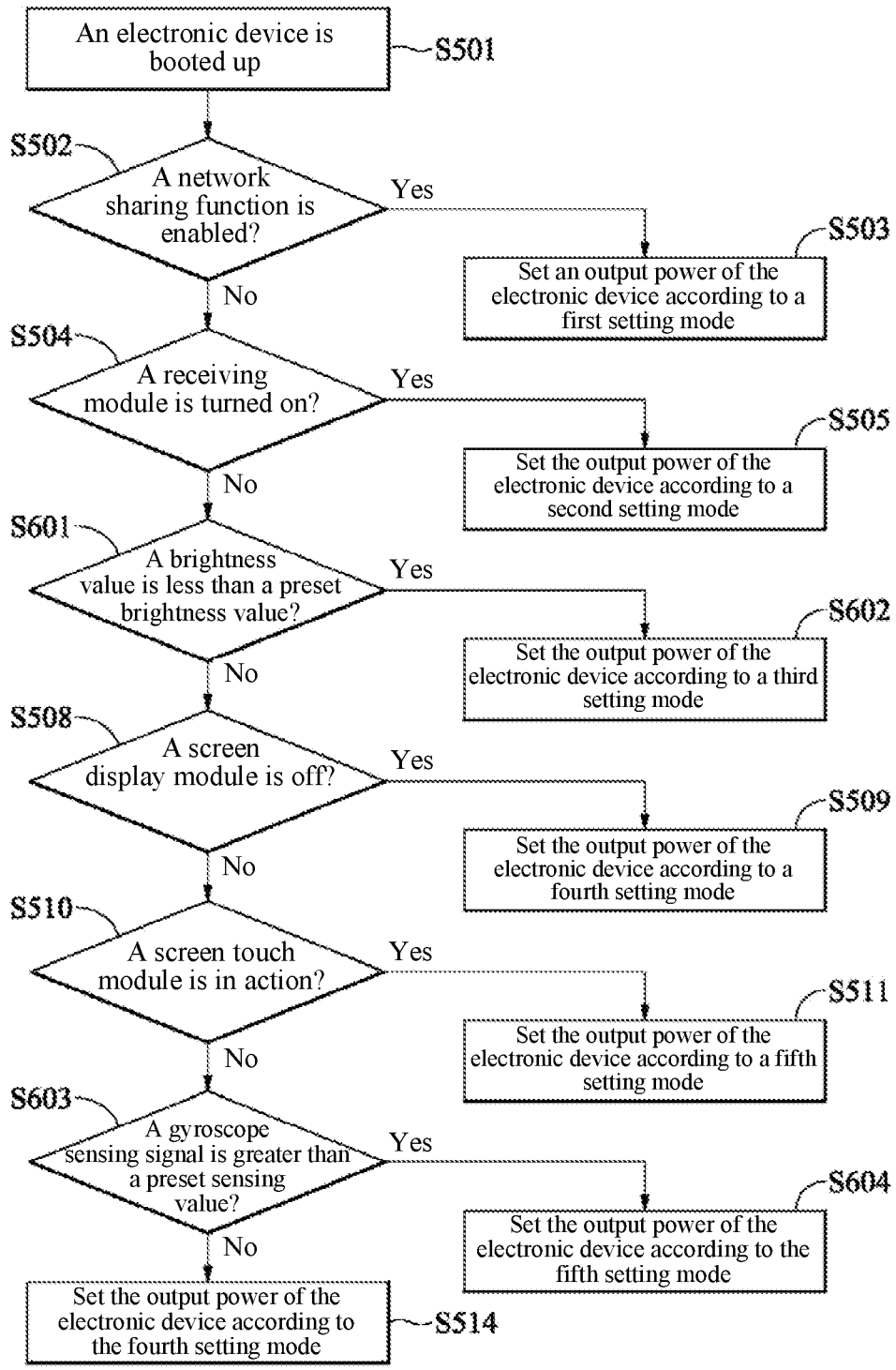
FIG. 6 is a flowchart of a power setting method according to some embodiments of the present invention.

FIG. 6 is a flowchart of a power setting method according to some embodiments of the present invention. Referring to FIG. 1, FIG. 6, and Table (1) together, in this embodiment, the intrinsic modules 102-1 to 102-N include a receiving module 202, a light sensing module 204, and a screen display module 205, a screen touch module 206, and a gyroscope module 208, and the executable function of the foregoing electronic device 100 includes a network sharing function.

In this embodiment, the light sensing module 204 ranks the third in the foregoing sequence. The current signal corresponding to the light sensing module 204 is a brightness value detected by the light sensing module 204 through the distance and optical element 303. A determining condition corresponding to the light sensing module 204 is that the brightness value is less than a preset brightness value, and a setting mode corresponding to the light sensing module 204 is a third setting mode. The third setting mode is the foregoing setting 3. The gyroscope module 208 ranks the sixth in the foregoing sequence, and the gyroscope module 208 is the last module. The current signal corresponding to the gyroscope module 208 is a gyroscope sensing signal corresponding to angular acceleration of the gyroscope module on X, Y, and Z axes that is detected by the gyroscope module 208. The determining condition corresponding to the gyroscope module 208 is that the gyroscope sensing signal is greater than a preset sensing value, the setting mode corresponding to the gyroscope module 208 is a fifth setting mode, and a preset mode is a fourth setting mode. The fifth setting mode is the foregoing setting 4, and the fourth setting mode is the foregoing setting 2.

In this embodiment, the gyroscope module 208 detects the angular acceleration of the gyroscope module on the X, Y, and Z axes and returns values co x, coy, and co r that correspond to the angular acceleration on the X, Y, and Z axes. The gyroscope sensing signal is defined as a sum of absolute values of $\omega_X$, $\omega_Y$, and $\omega_Z$, that is, Gyroscope sensing signal=$|\omega_X|+|\omega_Y|+|\omega_Z|$.

The rest of the sequence of the intrinsic modules 102-1 to 102-N and the executable functions of the electronic device 100, determining conditions corresponding to the intrinsic modules 102-1 to 102-N and the executable functions of the electronic device 100, and setting modes corresponding to the intrinsic modules 102-1 to 102-N and the executable function of the electronic device 100 is the same as the embodiment show in FIG. 5.

Referring to FIG. 6 again, the processor 101 determines in step S504 based on the receiving signal whether the receiving module 202 is turned on. If not, the processor determines in step S601 whether the brightness value of the electronic device 100 detected through the distance and optical element 303 is less than the preset brightness value. If so, the electronic device 100 is in the usage scenario that "the electronic device is in a pocket or a holster", and the processor 101 sets the output power of the electronic device 100 according to the third setting mode (setting 3) in step S602. If not, the processor 101 determines in step S508, according to the screen touch signal, whether the screen display module 205 is off. The processor 101 determines in step S510 that the screen touch module is in action. If not, the processor determines in step S603 whether the gyroscope sensing signal is greater than the preset sensing value. If so, the electronic device 100 is in the usage scenario of "hand-held and in use (without a screen touch action)", and the processor 101 sets the output power of the electronic device 100 according to the fifth setting mode (setting 4) in step S604. If not, the electronic device 100 is in the usage scenario of "not in use" and there is no human body or object nearby, and the processor 101 sets the output power of the electronic device 100 according to the fourth setting mode (setting 2) in step S514. The remaining steps are the same as those in the embodiment shown in FIG. 5.

Figure 7:
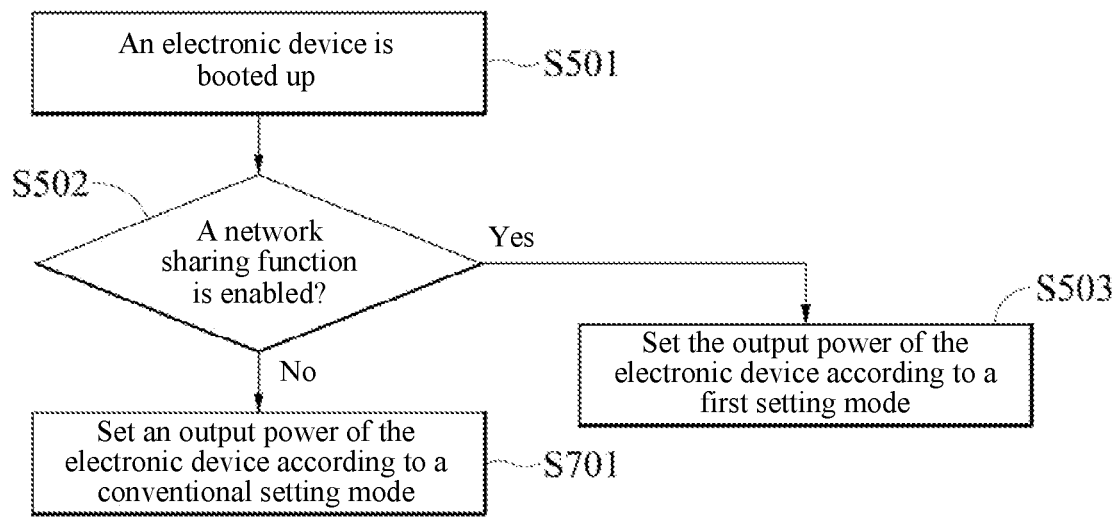
FIG. 7 is a flowchart of a power setting method according to some embodiments of the present invention.

It should be noted that in the foregoing embodiments, the processor 101 determines a setting mode for setting the output power of the electronic device 100 based on return signals of a plurality of items. The processor 101 may alternatively determine a setting mode for setting the output power of the electronic device 100 based on a return signal of a single item. FIG. 7 is a flowchart of a power setting method according to some embodiments of the present invention. Referring to FIG. 7, in some embodiments of the present invention, the power setting method includes step S501, step S502, step S503, and step S701. That is, after the electronic device 100 is booted up (step S501), the processor 101 determines in step S502, according to an enable signal for detecting whether a network sharing function is enabled, whether the network sharing function of the electronic device 100 is enabled, and if the network sharing function is enabled, the processor 101 sets the output power of the electronic device 100 according to the foregoing first setting mode (setting 0) in step S503. If the network sharing function is off, the processor 101 sets the output power of the electronic device 100 according to a conventional setting mode in step S701.

Figure 8:
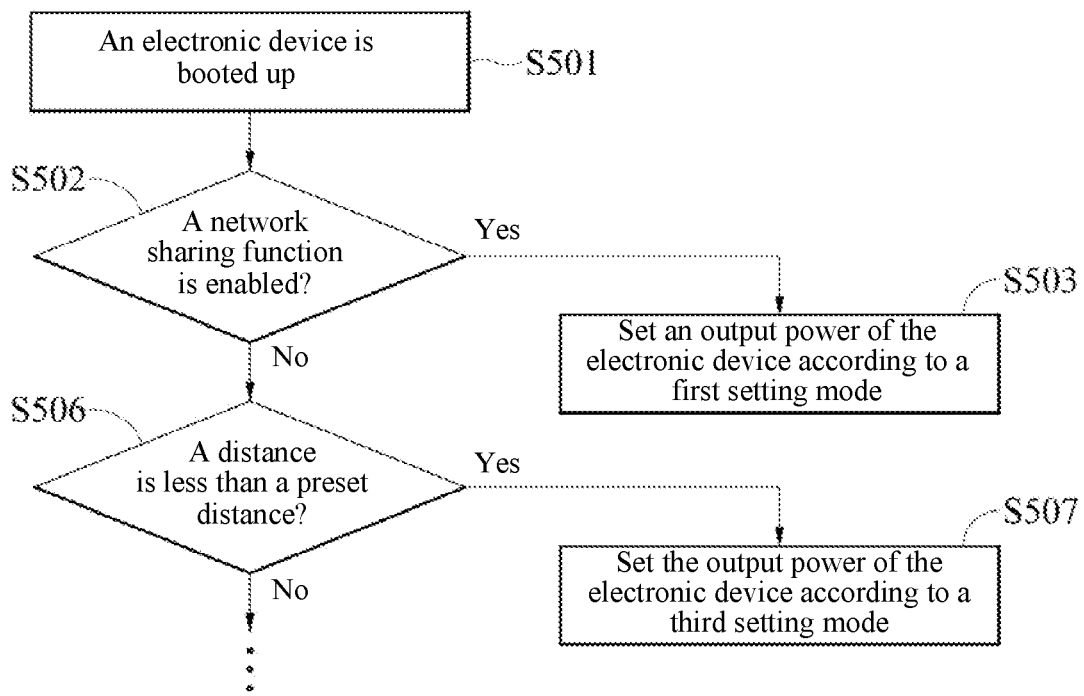
FIG. 8 is a flowchart of a power setting method according to some embodiments of the present invention.

FIG. 8 is a flowchart of a power setting method according to some embodiments of the present invention. Referring to FIG. 8, in the embodiment shown in FIG. 8, the power setting method includes step S501, step S502, step S503, S506, and step S507. That is, after the electronic device 100 is booted up (step S501), the processor 101 determines in step S502, according to an enable signal for detecting whether a network sharing function is enabled, whether the network sharing function of the electronic device 100 is enabled, and if the network sharing function is enabled, the processor 101 sets the output power of the electronic device 100 according to the foregoing first setting mode (setting 0) in step S503. If the network sharing function is off, the processor determines in step S506 whether a distance between the electronic device 100 and any object is less than a preset distance. If the processor 101 determines that the distance between the electronic device 100 and any object is less than the preset distance, the processor 101 sets the output power of the electronic device 100 according to the third setting mode setting 3) in step S507.

Figure 9:
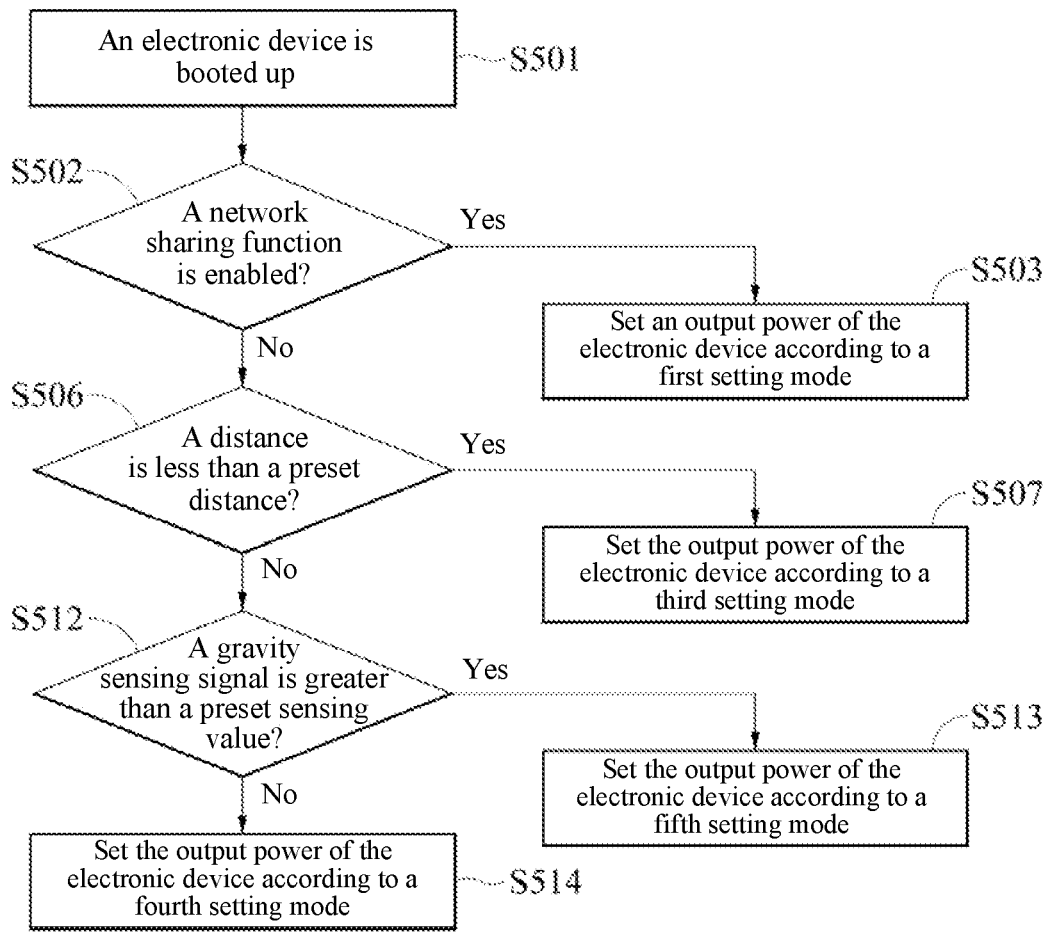
FIG. 9 is a flowchart of a power setting method according to some embodiments of the present invention.

FIG. 9 is a flowchart of a power setting method according to some embodiments of the present invention. Referring to FIG. 9, compared with the embodiment shown in FIG. 8, the embodiment shown in FIG. 9 further includes step S512, step S513, and step S514. In step S506, if the processor 101 determines that the distance between the electronic device 100 and the any object is not less than the preset distance, the processor 101 determines in step S512 whether a gravity sensing signal is greater than a preset sensing value. If so, the processor 101 sets the output power of the electronic device 100 according to the fifth setting mode (setting 4) in step S513. If not, the processor 101 sets the output power of the electronic device 100 according to the fourth setting mode (setting 2) in step S514.

Figure 10:
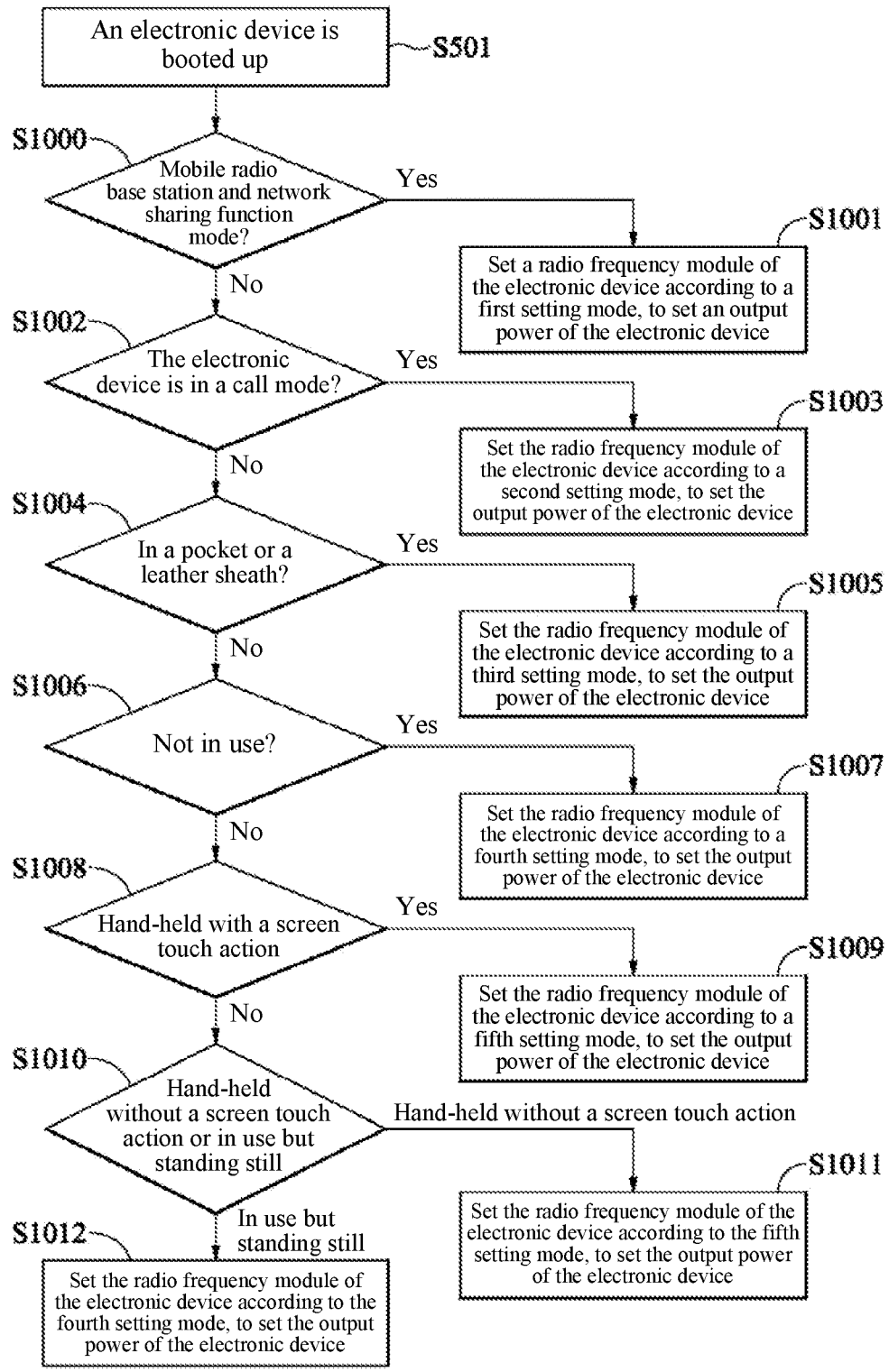
FIG. 10 is a flowchart of a power setting method according to some embodiments of the present invention.

FIG. 10 is a flowchart of a power setting method according to some embodiments of the present invention. Referring to FIG. 1, FIG. 10, and Table (1) together, in this embodiment, the processor 101 sets an operating power of the radio frequency module 103 based on a usage scenario of the electronic device 100, to set the output power of the electronic device 100.

In step S501, the electronic device 100 is booted up, and performs step S1000. In step S1000, the processor 101 determines whether the electronic device 100 is in the usage scenario of "mobile wireless base station and network sharing function mode". If so, the processor 101 sets the radio frequency module 103 of the electronic device 100 according to a first setting mode (setting 0) in step S1001, to set the output power of the electronic device 100. If not, the processor determines in step S1002 whether the electronic device 100 is in the usage scenario of "call mode". If so, the processor 101 sets the radio frequency module 103 of the electronic device 100 according to a second setting mode (setting 1) in step S1003, to set the output power of the electronic device 100. If not, the processor determines in step S1004 whether the electronic device 100 is in a pocket or a holster.

If the processor 101 determines that the electronic device 100 is in a pocket or a holster, the processor 101 sets the radio frequency module 103 of the electronic device 100 according to a third setting mode (setting 3) in step S1005, to set the output power of the electronic device 100. If not, the processor determines in step S1006 whether the electronic device 100 is in the usage scenario of "not in use". If so, the processor 101 sets the radio frequency module 103 of the electronic device 100 according to a fourth setting mode (setting 2) in step S1007, to set the output power of the electronic device 100. If not, the processor 101 determines in step S1008 whether the electronic device 100 is in the usage scenario of "hand-held and in use (with a screen touch action)" (that is, hand-held and having a screen touch action). If so, the processor 101 sets the radio frequency module 103 of the electronic device 100 according to a fifth setting mode (setting 4) in step S1009, to set the output power of the electronic device 100. If not, the processor determines in step S1010 that the electronic device 100 is in the usage scenario of "hand-held and in use (without a screen touch action)" (that is, hand-held but having no screen touch action) or "in use but placed on a table or a shelf" (that is, in use but standing still).

If the processor 101 determines that the electronic device 100 is in the usage scenario of "hand-held and in use (without a screen touch action)" (that is, hand-held but having no screen touch action), the processor sets the radio frequency module 103 of the electronic device 100 according to the fifth setting mode (setting 4) in step S1011, to set the output power of the electronic device 100. If the processor 101 determines that the electronic device 100 is in the usage scenario of "in use but placed on a table or a shelf" (that is, in use but standing still), the processor 101 sets the radio frequency module 103 of the electronic device 100 according to the fourth setting mode (setting 2) in step S1012, to set the output power of the electronic device 100.

Referring to FIG. 2 again, the internal memory 209 is, for example, a random access memory (RAM). Certainly, the electronic device 100 may further include hardware required for other functions.

The internal memory 209 and the non-volatile memory 210 are configured to store a program. The program may include program code, and the program code includes computer operation instructions. The internal memory 209 and the non-volatile memory 210 provide instructions and data to the processor 101. The processor 101 reads corresponding computer program from the non-volatile memory 210 into the internal memory 209 and executes the computer program. The processor 101 is specifically configured to perform steps described in FIG. 4 to FIG. 6.

The processor 101 may be an integrated circuit chip and has a signal processing capability. In an implementation process, the methods and steps disclosed in the foregoing embodiments may be implemented through a hardware integrated logic circuit or instructions in the form of software in the processor 101. The processor 101 may be a general-purpose processor, including a central processing unit (CPU), a tensor processing unit, a digital signal processor (DSP), an application specific integrated circuit (ASIC), or a field-programmable gate array (FPGA), or other programmable logic devices, which can implement or perform the methods and steps disclosed in the foregoing embodiments.

In some embodiments of the present invention, a computer-readable recording medium storing a program is also provided. The computer-readable recording medium stores at least one instruction. When the at least one instruction is executed by the processor 101 of the electronic device 100, the processor 101 of the electronic device 100 can be caused to execute the steps described in FIG. 4 to FIG. 6.

Examples of a computer storage medium include, but are not limited to, a phase-change memory (PRAM), a static random access memory (SRAM), a dynamic random access memory (DRAM) or a random access memory (RAM) of another type, a read-only memory (ROM), an electrically-erasable programmable read-only memory (EEPROM), a flash memory or another internal memory technology, a compact-disc read-only memory (CD-ROM), a digital versatile disc (DVD) or another optical storage device, a magnetic tape cassette, a magnetic tape storage device or another magnetic storage device, or any other non-transmission medium, which can be configured to store information that can be accessed by a computing device. Based on the definition in this specification, the computer-readable medium does not include transient media, such as modulated data signals and carrier waves.

Based on the above, the electronic device, the power setting method, the computer-readable recording medium storing a program, and the non-transitory computer program product that are provided by some embodiments of the present invention dynamically adjust an output power of a communication product by integrating use status and related signals of the intrinsic modules of the electronic device and the executable functions of the electronic device, so that the electronic device can output an appropriate power without adding more sensors.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A power setting method, applicable to an electronic device, wherein the electronic device comprises a processor, the power setting method is performed by the processor, and the power setting method comprises:

determining in a situation that, according to an enable signal corresponding to a network sharing function of the electronic device, the network sharing function is enabled;

in response to the network sharing function being enabled, setting an output power of the electronic device according to a first setting mode; in response to the network sharing function being not enabled, determining in a situation that, according to a receiving signal corresponding to a receiving module of the electronic device, the receiving module is in action; and in response to the receiving module being in action, setting the output power of the electronic device according to a second setting mode; wherein the first setting mode corresponds to a body specific absorption rate test and the second setting mode corresponds to a head specific absorption rate test.

2. The power setting method according to claim 1, comprising:

in response to the receiving module being not in action, determining in a situation that, according to a distance between the electronic device and an object detected by a distance sensing module of the electronic device, the distance is less than a preset distance; and in response to the distance being less than the preset distance, setting the output power of the electronic device according to a third setting mode; wherein the third setting mode corresponds to the body specific absorption rate test.

3. The power setting method according to claim 2, comprising:

in response to the distance being not less than the preset distance, determining in a situation that, according to a screen display signal corresponding to a screen display module of the electronic device, the screen display module is off; and in response to the screen display module being off, setting the output power of the electronic device according to a fourth setting mode; wherein the fourth setting mode corresponds to a not-in-use setting.

4. The power setting method according to claim 1, comprising:

in response to the receiving module being not in action, determining in a situation that, according to a brightness value detected by a light sensing module of the electronic device, the brightness value is less than a preset brightness value; and in response to the brightness value is less than the preset brightness value, setting the output power of the electronic device according to a third setting mode; wherein the third setting mode corresponds to the body specific absorption rate test.

5. The power setting method according to claim 4, comprising:

in response to the brightness value being not less than the preset brightness value, determining in a situation that, according to a screen display signal corresponding to a screen display module of the electronic device, the screen display module is off; and in response to the screen display module being off, setting the output power of the electronic device according to a fourth setting mode; wherein the fourth setting mode corresponds to a not-in-use setting.

6. The power setting method according to claim 3, comprising:

in response to the screen display module being turned on, determining in a situation that, according to a screen touch signal corresponding to a screen touch module of the electronic device, the screen touch module is in action; and in response to the screen touch module being in action, setting the output power of the electronic device according to a fifth setting mode; wherein the fifth setting mode corresponds to an extremity specific absorption rate test.

7. The power setting method according to claim 6, comprising:

in response to the screen touch module being not in action, determining in a situation that, according to a gravity sensing signal corresponding to a plurality of acceleration signals detected by a gravity sensing module of the electronic device, the gravity sensing signal is greater than a preset sensing value;

in response to the gravity sensing signal being greater than the preset sensing value, setting the output power of the electronic device according to the fifth setting mode; and in response to the gravity sensing signal being not greater than the preset sensing value, setting the output power of the electronic device according to the fourth setting mode.

8. The power setting method according to claim 6, comprising:

in response to the screen touch module being not in action, determining in a situation that, according to a gyroscope sensing signal corresponding to a plurality of angular acceleration signals detected by a gyroscope module of the electronic device, the gyroscope sensing signal is greater than a preset sensing value;

in response to the gyroscope sensing signal being greater than the preset sensing value, setting the output power of the electronic device according to the fifth setting mode; and in response to the gyroscope sensing signal being not greater than the preset sensing value, setting the output power of the electronic device according to the fourth setting mode.

9. The power setting method according to claim 5, comprising:

in response to the screen display module being on, determining in a situation that, according to a screen touch signal corresponding to a screen touch module of the electronic device, the screen touch module is in action; and in response to the screen touch module being in action, setting the output power of the electronic device according to a fifth setting mode; wherein the fifth setting mode corresponds to an extremity specific absorption rate test.

10. A power setting method, applicable to an electronic device, wherein the electronic device comprises a processor, the power setting method is performed by the processor, and the power setting method comprises:

determining in a situation that, according to an enable signal corresponding to a network sharing function of the electronic device, the network sharing function is enabled;

in response to the network sharing function being enabled, setting an output power of the electronic device according to a first setting mode;

determining in a situation that, according to a distance between the electronic device and an object detected by a distance sensing module of the electronic device, the distance is less than a preset distance, in response to the network sharing function being not enabled; and in response to the distance being less than the preset distance, setting the output power of the electronic device according to a third setting mode; wherein the first setting mode corresponds to a body specific absorption rate test and the third setting mode corresponds to the body specific absorption rate test.

11. The power setting method according to claim 10, comprising:

in response to the distance being not less than the preset distance, determining in a situation that, according to a gravity sensing signal corresponding to a plurality of acceleration signals detected by a gravity sensing module of the electronic device, the gravity sensing signal is greater than a preset sensing value;

in response to the gravity sensing signal being greater than the preset sensing value, setting the output power of the electronic device according to a fifth setting mode; and in response to the gravity sensing signal being not greater than the preset sensing value, setting the output power of the electronic device according to a fourth setting mode wherein the fourth setting mode corresponds to a not-in-use setting and the fifth setting mode corresponds to an extremity specific absorption rate test.

12. A power setting method, applicable to an electronic device, wherein the electronic device comprises a processor, the power setting method is performed by the processor, and the power setting method comprises:

determining in a situation that the electronic device is in a mobile wireless base station and network sharing function mode;

in response to the electronic device being in the mobile wireless base station and network sharing function mode, setting a radio frequency module of the electronic device according to a first setting mode to set an output power of the electronic device; in response to the electronic device being not in the mobile wireless base station and network sharing function mode, determining in a situation that the electronic device is in a call mode; and in response to the electronic device being in the call mode, setting the radio frequency module of the electronic device according to a second setting mode to set the output power of the electronic device; wherein the first setting mode corresponds to a body specific absorption rate test and the second setting mode corresponds to a head specific absorption rate test.

13. The power setting method according to claim 12, comprising:

in response to the electronic device being not in the call mode, determining in a situation that the electronic device is in a pocket or a holster; and in response to the electronic device being in the pocket or the holster, setting the radio frequency module of the electronic device according to a third setting mode to set the output power of the electronic device; wherein the third setting mode corresponds to the body specific absorption rate test.

14. The power setting method according to claim 13, comprising:

determining in a situation that the electronic device is not in use in response to the electronic device being not in the pocket or the holster; and in response to the electronic device being not in use, setting the radio frequency module of the electronic device according to a fourth setting mode to set the output power of the electronic device; wherein the fourth setting mode corresponds to a not-in-use setting.

15. The power setting method according to claim 14, comprising:
    in response to the electronic device being in use, determining in a situation that the electronic device is hand-held with a screen touch action; and
    in response to the electronic device being hand-held with a screen touch action, setting the radio frequency module of the electronic device according to a fifth setting mode to set the output power of the electronic device; wherein the fifth setting mode corresponds to an extremity specific absorption rate test.

16. The power setting method according to claim 15, comprising:
    in response to the electronic device being not hand-held with a screen touch action, determining in a situation that the electronic device is hand-held but does not have a screen touch action or is in use but stands still;
    in response to the electronic device being hand-held but not having a screen touch action, setting the radio frequency module of the electronic device according to the fifth setting mode to set the output power of the electronic device; and
    in response to the electronic device being in use but standing still, setting the radio frequency module of the electronic device according to the fourth setting mode to set the output power of the electronic device.

\* \* \* \* \*